J. D. JOHNSON.
POWER TRANSMITTING APPARATUS.
APPLICATION FILED DEC. 20, 1916.

1,262,350.

Patented Apr. 9, 1918.
4 SHEETS—SHEET 1.

INVENTOR
John D. Johnson
BY
C. D. Haskins
ATTORNEY

FIG. 3

J. D. JOHNSON.
POWER TRANSMITTING APPARATUS.
APPLICATION FILED DEC. 20, 1916.

1,262,350.

Patented Apr. 9, 1918.
4 SHEETS—SHEET 4.

INVENTOR
John D. Johnson
BY
C. D. Haskins
ATTORNEY

UNITED STATES PATENT OFFICE.

JOHN D. JOHNSON, OF SPOKANE, WASHINGTON, ASSIGNOR TO JOHNSON POWER TRANSMISSION COMPANY, OF SEATTLE, WASHINGTON, A CORPORATION OF WASHINGTON.

POWER-TRANSMITTING APPARATUS.

1,262,350.   Specification of Letters Patent.   Patented Apr. 9, 1918.

Application filed December 20, 1916. Serial No. 138,112.

*To all whom it may concern:*

Be it known that I, JOHN D. JOHNSON, citizen of the United States, residing at Spokane, in the county of Spokane and State of Washington, have invented a certain new and useful Improvements in Power-Transmitting Apparatus, of which the following is a specification.

My invention relates to improvements in power transmitting apparatus of that class which is adapted to communicate rotary motion from a driving shaft to a driven shaft, and the object of my invention is to provide a power transmitting apparatus that shall be adapted to communicate rotary motion from a driving shaft to a driven shaft to cause said driven shaft to be rotated at any one of different rates of speed as may be desired at different times, and which shall be further adapted to cause said driven shaft to reverse the direction of its rotation as may be required.

A further object of my invention is to provide a power transmitting mechanism of such form of construction that all of its operative parts shall be adapted to withstand sudden and abnormally great strains without breaking or injuring any of such parts. A still further object of my invention is to provide a power transmitting apparatus which shall be especially adapted for transmitting rotary motion in either direction from the driving shaft of an engine associated with an automobile to the differential mechanism that communicates rotary motion to the tractor wheels of such automobile to cause such tractor wheels to revolve at a required one of different rates of speed.

I accomplish these objects by devices illustrated in the accompanying drawings wherein—

Figure 1:
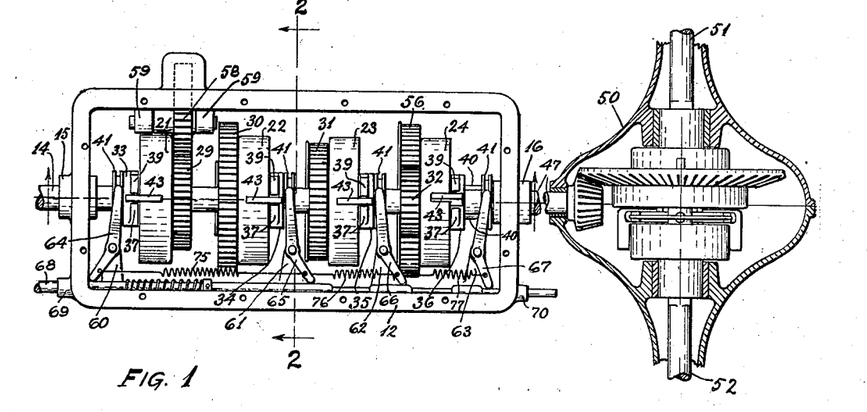
Figure 1 is a plan view on a reduced scale of the operative parts of a power transmitting apparatus associated with the driving shaft of the engine of an automobile and with the differential mechanism that communicates rotary motion to the tractor wheels, not shown, of said automobile.
Figure 2:
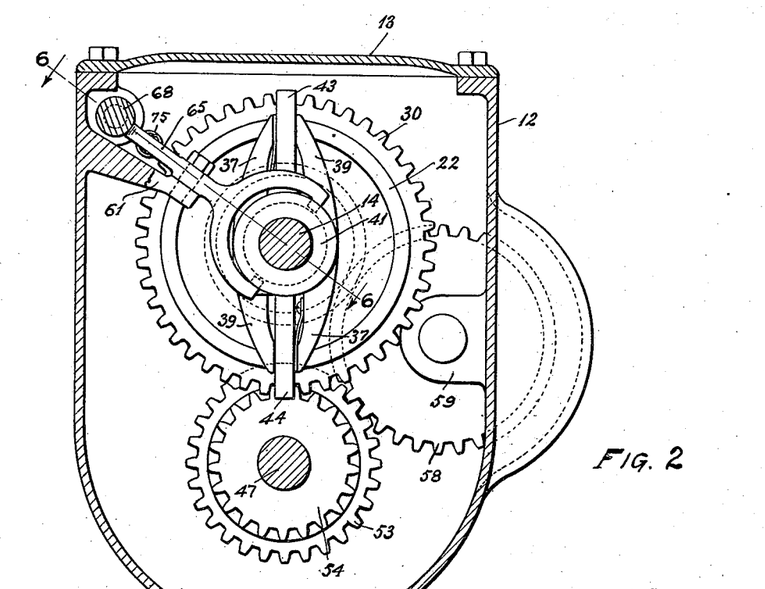
Fig. 2 is a view of the same, on a larger scale, in cross-section on broken line 2, 2 of Fig. 1.
Figure 3:
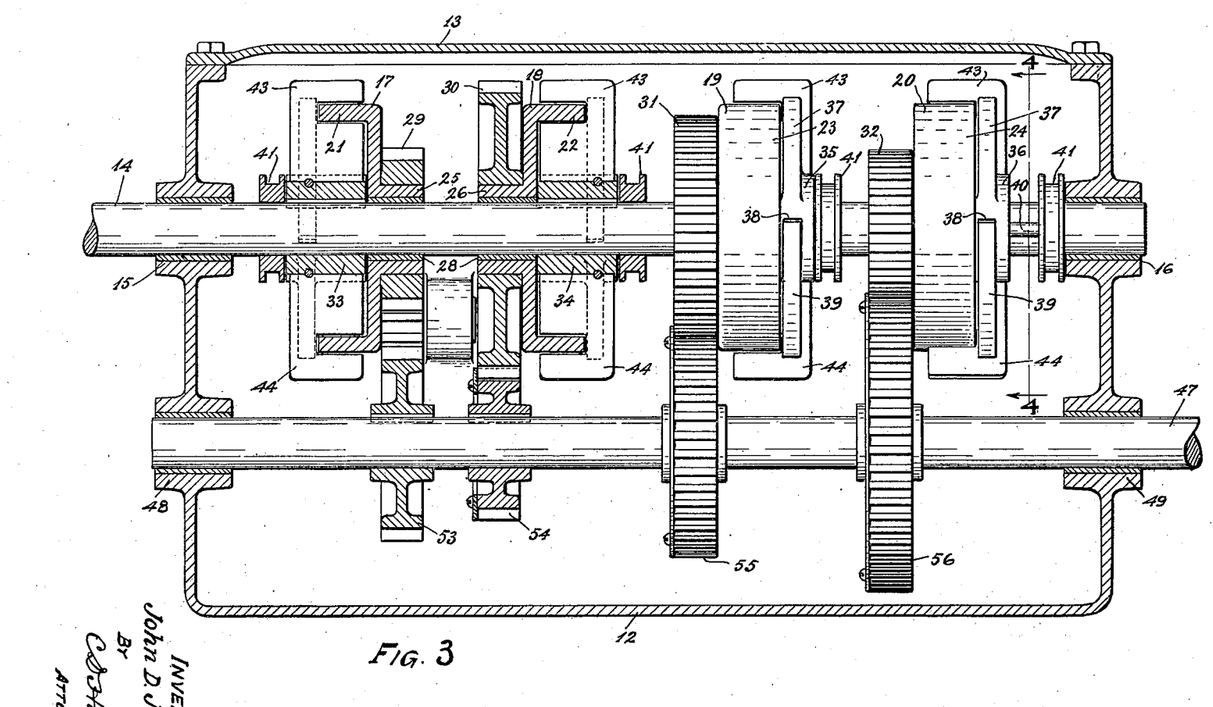
Fig. 3 is a view, on the same larger scale, partly in side elevation and partly in vertical and longitudinal mid-section on broken line 3, 3 of Fig. 1, showing some of the operative parts of the same.

Referring to the drawings, throughout which like reference numerals indicate like parts, 12 is an inclosing case provided with a removable cover 13, as shown in Figs. 2 and 3, which inclosing case 12 is shown in Fig. 1 with its cover removed, and which inclosing case may be readily adapted (by means not shown) to be rigidly associated with the chassis of an automobile in a position whereby the rearwardly extended end portion of the driving shaft 14 of said automobile is rotatably disposed in bearings 15 and 16 provided in the opposite end walls, respectively, of the inclosing case 12, as shown more clearly in Fig. 3, and as indicated in Fig. 1, thus to extend through the interior of the inclosing case 12, in a lengthwise direction thereof.

Figure 5:
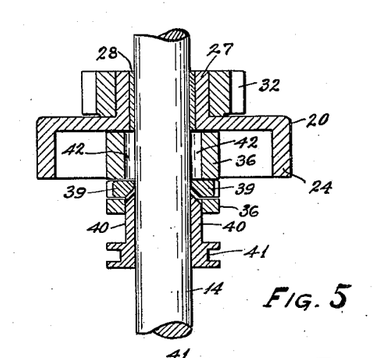
Fig. 5 is a view in longitudinal mid-section of parts of the same on broken line 5, 5 of Fig. 4.

Mounted on the driving shaft 14, within the inclosing case 12, at different points spaced from each other, freely to revolve therearound are a plurality of disks 17, 18, 19 and 20, respectively, all of which are provided with integral annular flanges 21, 22, 23 and 24, respectively, and which are provided with integral hubs, like hubs 25, 26 and 27, shown only in Figs. 3 and 5.

All of the hubs of the said disks 17, 18, 19 and 20 are provided with bushings, like bushings 28, shown only in Figs. 3 and 5, which bushings 28 may be made of metal especially adapted to resist wear and to present wearing surfaces having little friction.

Concentrically fixed on the hub of each of the disks 17, 18, 19 and 20 is a gearwheel, as gearwheels 29, 30, 31 and 32 respectively.

Securely keyed to the driving shaft 14 are a plurality of co-axially disposed sleeves, as sleeves 33, 34, 35 and 36, one end portion of the sleeve 33 being disposed adjacent to the inner side of the disk 17, thus to be encircled by the flange 21, and the sleeves 34, 35 and 36 being disposed in corresponding positions with respect to the disks 18, 19 and 20.

Figure 4:
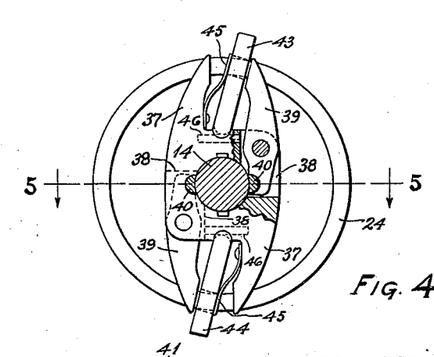
Fig. 4 is a cross-sectional view of parts of the same on broken line 4, 4 of Fig. 3.

Those end portions of the sleeves 33, 34, 35 and 36 which project outwardly from the spaces within the encircling flanges 21, 22, 23 and 24 are each provided with integral oppositely disposed arms, like arms 37, as shown more clearly in Figs. 1 and 4.

Each of said sleeves 33, 34, 35 and 36 is provided with oppositely disposed slots, like the slots 38, one of which is shown by full lines and another of which is indicated by dotted lines designated by the numeral 38 in Fig. 4, each of which slots 38 is disposed opposite to, and to register with, a different one of the arms 37, and within each of said slots 38 is a pivotally mounted lever 39 which is adapted to be moved on its pivot to swing its longer outer end portion toward and away from the nearer one of the arms 37 in response to the cam-like action of a semi-cylindrical pin 40 which is adapted to engage and disengage with the inner side of the inner end portion of said lever 39, as shown more clearly in Figs. 4 and 5.

The semi-cylindrical pins 40 are disposed opposite each other and are integral with a grooved collar 41 from one side of which collar 41 they project to extend parallel with and adjacent to the shaft 14 and into longitudinal recesses like recesses 42 formed at opposite points in the several sleeves 33, 34, 35 and 36 adjacent to the shaft 14 as shown with respect to the sleeve 36 in Fig. 5.

The inner end portions of the pins 40 are beveled each to act like a cam to force the inner end of the lever 39 outwardly in response to a movement of the collar 41 toward the adjacent sleeve, thus to cause the outer end portion of each of the levers 39 to move like a jaw toward the opposite arm 37 in an obvious manner.

Each of the sleeves 33, 34, 35 and 36 is provided with oppositely disposed longitudinal grooves of semi-circular cross-section in its peripheral surface which grooves extend throughout the length thereof, and which are disposed to register with the space between the respective arms 37 and levers 39 as indicated in Fig. 4.

Projecting within each of the annular spaces between the sleeves 33, 34, 35 and 36 and the flanges 21, 22, 23 and 24, respectively, are portions of two oppositely disposed clutch dogs 43 and 44, each of which is provided with a transverse slot extending therethrough from one of its side edges toward its opposite side edge for a distance nearly equal to the depth of said annular spaces, said slot being spaced from one of its end edges and extending parallel therewith, and each of which dogs 43 and 44 has its opposite end surface rounded to be semi-circular in form.

The width of the slot of each of the dogs 43 and 44 is slightly greater than the thickness of the several flanges 21, 22, 23 and 24, and each is disposed with its rounded end freely projected into a different one of the semi-circular longitudinal slots formed in the peripheral surfaces of the sleeves 33, 34, 35 and 36 to extend therefrom in such position that a respective one of the flanges 21, 22, 23 and 24 will project within its slot in such manner as indicated in Fig. 4, that if said dog swings sidewise it will clamp and clutch its associated one of the flanges 21 22, 23, and 24 in an obvious manner well known.

The outwardly projecting edge portion of each of the dogs 43 and 44 is disposed in the space between one of the arms 37 and the opposite outer end portion of the lever 39, as shown more clearly in Fig. 4, and secured to the inner side edge surface of each of the arms 37 is a sheet metal spring, like springs 45 shown in Fig. 4, said springs 45 preferably being made of tempered steel, and each of said springs 45 being formed normally to press against the adjacent one of the dogs 43 and 44 normally to cause such adjacent dog tightly to clutch the adjacent one of the flanges 21, 22, 23, 24, as indicated in Fig. 4, but, however, when the associated grooved collar 41 is moved toward the adjacent one of the sleeves 33, 34, 35 and 36 to cause the pins 40 to enter the recesses 42, then said pins 40 in a cam-like manner will actuate the levers 39 to cause their outer end portions to press against the adjacent one of the dogs 43 and 44 to swing it toward the adjacent one of the arms 37 against the force of the spring 45, thus to fully release said one of the dogs 43 and 44, whereby the shaft 14 may revolve without imparting rotary motion to the associated one of the disks 17, 18, 19 and 20 and their respective gearwheels 29, 30, 31 and 32.

In order to prevent any of the dogs 43 and 44 from slipping in an edgewise direction outwardly from its position, as shown in Fig. 3, each of the sleeves 33, 34, 35 and 36 is provided with holes indicated by dotted lines 46 in Fig. 4, each of which intersects the bottom portion of a different one of the longitudinal groove formed in the peripheral surface thereof, and the rounded edge of the inner end of each of the dogs 43 and 44 is provided with a transverse notch disposed to register with the holes indicated by said dotted lines 46, and each of said holes is provided with a pin, removably disposed therein, whereby the surfaces of said notch may engage with said pin to prevent the associated dog from moving in edgewise directions.

It is manifest that only that one of the gearwheels 29, 30, 31 and 32 which is associated with a collar 41 that is moved to its position most distant from its associated one of the sleeves 33, 34, 35 and 36 will be rotated in response to revolutions of the driving shaft 14, since with said collar 41 by reason of such distant position causes its semi-circular pins 40 to disengage from the levers 39 thereby to permit the springs 45 to force the dogs 43 and 44 into the positions indicated in Figs. 4 and 5 where said dogs 43 and 44 will securely clutch the adjacent one of the flanges 21, 22, 23 and 24 thus to rotate the gearwheel associated therewith.

Extending through the inclosing case 12 parallel with and spaced from the driving shaft 14 is a driven shaft 47 rotatably disposed in bearings 48 and 49 provided in the opposite end walls of said inclosing case 12, as shown more clearly in Fig. 3, which driven shaft 47 may be extended operatively to connect with differential mechanism contained in a housing 50 by which mechanism rotary motion may be communicated from said driven shaft 47 to axles 51 and 52 with which are associated the tractor wheels, not shown, of the associated automobile, said mechanism being no part of my present invention but which mechanism constitutes the subject of a co-pending application for another patent.

Securely fastened on the driven shaft 47 within the inclosing case 12 are four gearwheels 53, 54, 55 and 56 of which the gearwheel 53 is disposed operatively to engage with an idler gearwheel 58 which is rotatably mounted in brackets 59 that are integral with the inner surface of a side wall of a casing 12, as indicated in Figs. 1 and 2, said gearwheel 58 being disposed operatively to engage with the gearwheel 29 of the shaft 14, whereby when the dogs 43 and 44 associated with the flange 21 of the disk 17 are actuated to clutch said flange 21, then the shaft 47 will be rotated in response to revolutions of the shaft 14 but in a different direction from the direction of rotation of said shaft 14.

The gearwheel 54 is disposed operatively to engage directly with the gearwheel 30, the gearwheel 55 is disposed operatively to engage with the gearwheel 31, and the gearwheel 56 is operatively disposed to engage with the gearwheel 32; and the relative diameters of the gearwheels 54 and 30, the gearwheels 55 and 31 and the gearwheels 56 and 32 are such that the speed of rotation of the shaft 47 in response to a given rate of speed of the rotating shaft 14 will depend upon which of the flanges 22, 23 and 24 is clutched by its associated dogs 43 and 44, it being possible, for reasons hereinafter to be explained, for only one of the flanges 21, 22, 23 and 24 to be usefully clutched by its associated dogs at the same time.

Integral with the inclosing case 12 are four bracket arms 60, 61, 62, 63 disposed to project obliquely downward and inwardly from the upper portion of the inner side of one of the side walls of said inclosing case 12, each of which bracket arms 60, 61, 62 and 63 is opposite a different one of the longitudinal paths of the grooved collars 41, and pivotally mounted on each of said bracket arms is a lever, as levers 64, 65, 66 and 67, respectively, one end portion of which is provided with oppositely disposed curved prongs which extend to and span the adjacent one of said grooved collars 41, each of which prongs is provided with an integral lug on its inner end portion which freely projects into the groove of said grooved collar 41, whereby a swinging sidewise movement of said lever will actuate said grooved collar 41 slidably to move on the shaft 14 in a lengthwise direction thereof.

Figure 6:
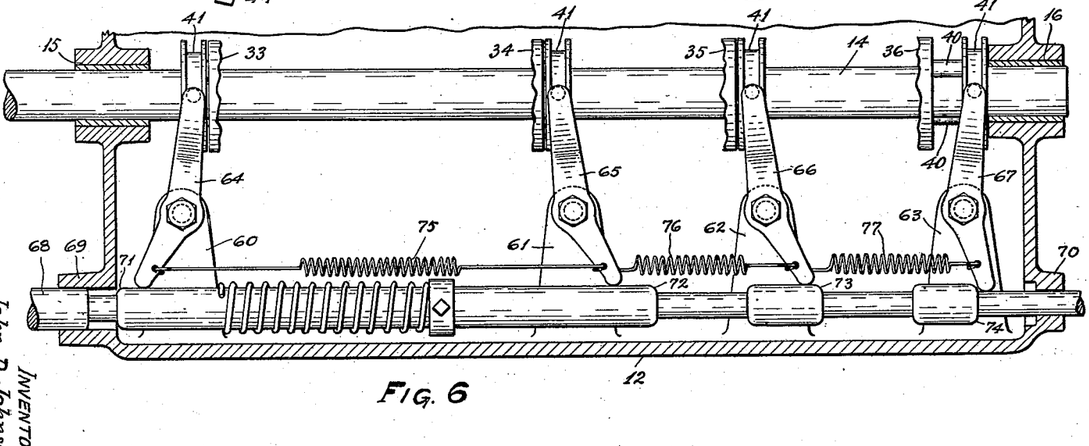
Fig. 6 is a fragmentary view of parts of the same in longitudinal section on broken line 6, 6 of Fig. 2.

The other end portion of each of said levers 64, 65, 66 and 67 is provided with a rounded end surface and extends for a distance from its pivot to adapt it to engage its rounded end surface with the cylindrical surface of a shifting rod 68, as shown more clearly in Fig. 6.

The shifting rod 68 extends through the inclosing case 12 in a position parallel with the shaft 14 adjacent to the upper sides of the bracket arms 60, 61, 62, and 63 and is slidably movable in its lengthwise directions in bearings 69 and 70 provided at opposite points in the end walls of the inclosing case 12, as shown more clearly in Fig. 6.

The rod 68, as more clearly shown in Fig. 6, is reduced in diameter at different portions within the inclosing case 12 to form rounded shoulders 71, 72, 73 and 74 adjacent to the rounded ends of the levers 64, 65, 66 and 67, respectively, which rounded shoulders may serve as cams to actuate said levers in response to lengthwise movements of the shifting rod 68, and the relative positions of said shoulders 71, 72, 73 and 74 are such that desired ones of the levers 64, 65, 66 and 67 can engage their rounded end surfaces with portions of the rod 68 that is of smaller diameter as indicated in said Fig. 6.

Thus, when the rod 68 is in the position shown in Fig. 6 the rounded ends of the levers 64, 65, and 66 engage with portions of the rod 68 that are of a larger diameter thereby to maintain the grooved collars 41 in positions to maintain the dogs 43 and 44 unclutched from the flanges of the disks 17, 18 and 19 to permit the gearwheels 29, 30 and 31 freely to revolve on the shaft 14, while the rounded edge of the lever 67 engages with a portion of the rod 68 that is of the smaller diameter, whereby said lever 67 will maintain the grooved collar 41 in a position to cause the dogs 43 and 44 to clutch the flange of the disk 20 thereby to cause the gearwheel 32 to revolve positively in response to the rotation of the shaft 14, which gearwheel 32 will actuate the gearwheel 56 to rotate the shaft 47 at its minimum speed with respect to the shaft 14.

If, however, the shifting rod 68 be moved in a right-hand direction for a short distance, then, in an obvious manner, the rounded shoulder 74, in a cam-like manner will actuate the lever 67 to move the grooved collar 41 to unclutch the dogs 43 and 44 from the flange of the disk 20 to free the gearwheel 32 from the effect of a rotation of the shaft 14, and the rounded end of the lever 64 will engage with the portion of the shaft 68 of smaller diameter that is adjacent to the shoulder 71, thus to cause said lever 64 to actuate its associated grooved collar 41 in a manner to cause the dogs 43 and 44 associated with the disk 17 to clutch the flange 21 of said disk 17, thereby to cause the gearwheel 29 to revolve with the shaft 14 to rotate the idler gearwheel 58 which, by its engagement with the gearwheel 53, will rotate the shaft 47 in a direction that is opposite to the direction of rotation of said shaft 14.

But, if the rod 68 be moved for a short distance toward the left-hand, from its position shown in Fig. 6, then the rounded end of the lever 66 will pass over the shoulder 73 to engage with the smaller diameter of the shaft 68 thus to cause said lever 66 to move its associated grooved collar 41 to actuate the dogs 43 and 44 to clutch the flange of the disk 19 thereby to cause the gearwheel 31 (which is larger in diameter than the gearwheel 32) to rotate the shaft 14 and actuate the gearwheel 55, (which is smaller than the gearwheel 56) to rotate the shaft 47 with a greater speed than the minimum speed thereof, with respect to the shaft 14.

Since the dogs 43 and 44 associated with all the flanges of the several disks 17, 18, 19 and 20 are adapted to clutch said flanges to rotate said disks only in one direction, it is obvious that the gear wheel 56 (being of larger diameter than the gearwheel 55) will cause the gearwheel 32, with its attached disk 20 to revolve around the shaft 14 in the same direction but at a greater speed than the associated dogs 43 and 44 and shaft 14 so that said dogs 43 and 44 will permit the flange 24 to slip between their clutching surfaces.

And in like manner if the rod 68 be moved still another short distance toward the left-hand then the rounded end of the lever 65 will pass over the shoulder 72 to permit said lever 65 to actuate the dogs 43 and 44, through the medium of the associated grooved ring 41, to clutch the flange 22 of the disk 18 to cause the gearwheel 30 (which is larger than the gearwheel 31) to revolve with the shaft 14 which gearwheel 30 will actuate the gearwheel 54 (which is the smallest of the three wheels 54, 55 and 56) to rotate the shaft 47 at its maximum speed with respect to the shaft 14 whereby in an obvious manner both of the disks 19 and 20 will revolve in the same direction with and faster than their respective pairs of dogs 43 and 44 so that the flanges of said disks 19 and 20 will slip between the clutching surfaces of said dogs 43 and 44.

Extending between the shorter ends of the levers 64 and 65 is a helical tension spring 75 which exerts a force having a tendency normally to cause said levers 64 and 65 to actuate their associated grooved collars 41 in a manner to cause their associated dogs 43 and 44 to clutch their associated flanges.

The shorter end of the lever 66 has attached to it a helical tension spring 76 which extends to and is connected with the bracket arm 61, the force of which spring 76 tends to keep the lever 66 in a position normally to maintain its associated grooved collar 41 in a position to cause the dogs 43 and 44 to clutch the flange of the disk 19.

The lower end of the lever 67 likewise has attached to it one end of a helical spring 77, whose other end is connected to the bracket arm 62 and whose force tends to keep the lever 67 in a position to cause its associated grooved collar 41 normally to be maintained in a position to permit the dogs 43 and 44 to clutch the flange 24.

Thus lengthwise movements of the shifting rod 68 may dispose it in any required one of different positions to cause the shaft 47 to rotate at a required speed with respect to the speed of the shaft 14.

Figure 7:
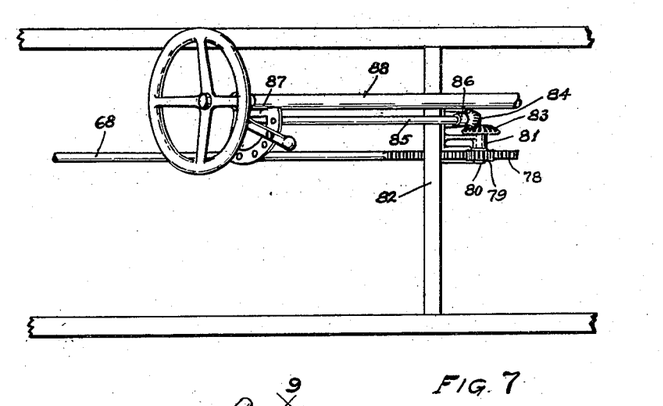
Fig. 7 is a plan view of mechanism associated with one of said parts, whereby the operation of the same may be controlled.
Figure 8:
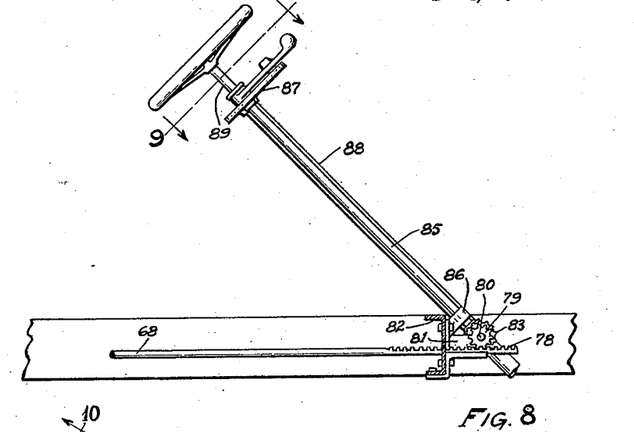
Fig. 8 is a view in side elevation of the parts shown in Fig. 7.

The shifting rod 68 may extend forward from the inclosing case 12 to terminate adjacent to the lower end of the steering shaft of the automobile, as illustrated in Figs. 7 and 8, in which Figs. 7 and 8, the forward end portion of said shifting rod is shown to be provided with a toothed rack 78 disposed to engage with a pinion 79 that is mounted on a shaft 80 which is rotatably disposed in bearings formed in a bracket 81 which is secured to a cross-bar 82 of the chassis of the automobile and on the opposite end of said shaft 80 is fastened a beveled gearwheel 83 which engages with another beveled gearwheel 84 that is fastened to the lower end of a shaft 85.

The shaft 85 is rotatably mounted in bearings formed one in a bracket 86 which is secured to the cross-bar 82 and the other in a bracket 87 that is secured to the tubular column 88 within which is disposed the steering shaft 89.

The bracket 87 is of the form of a segment of a circle and in the upper surface of its rim are formed five holes, like holes 90, 91, 92, 93 and 94.

Figure 10:
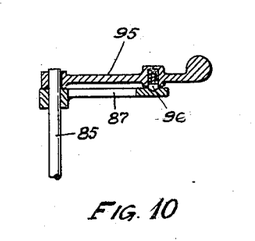
Fig. 10 is a sectional view on broken line 10, 10 of Fig. 9, showing details of the mechanism illustrated in Figs. 7 and 8.

Fixed on the upper end of the shaft 85 is a crank handle 95 which extends radially in a position to swing in a path adjacent to the top surface of the bracket 87, and in the underside of said crank handle 95 there is provided a resilient and yielding detent 96, as indicated in Fig. 10, which detent is disposed to adapt it to insert itself at different times into each of the holes 90, 91, 92, 93 and 94 in response to a swinging movement of the crank handle 95, thus yieldingly to detain said crank handle 95 in a desired one of said holes 90, 91, 92, 93 and 94.

Figure 9:
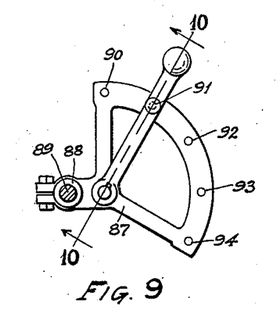
Fig. 9 is a view in cross-section on broken line 9, 9 of Fig. 8, showing parts of the mechanism illustrated in Figs. 7 and 8.

When the shifting rod 68 is thus associated with the actuating and controlling parts illustrated in Figs. 7, 8, 9 and 10, it is obvious that said rod 68 may be adjusted with respect to the relation between its toothed rack 78 and the gearwheel 79 so that when the crank arm 95 is in the position shown in Fig. 9, with its detent 96 disposed in the hole 91, then the shifting rod 68 may be in a position where the rounded ends of all of the levers 64, 65, 66 and 67 will be engaged with portions of said rod 68 which are of the larger diameter whereby all of the dogs 43 and 44 will be unclutched whereby the shaft 14 will rotate without rotating the shaft 47.

If, however, the crank handle 95 be turned to insert its detent 96 in the hole 90 then the rod 68 will be in a position to cause the lever 64 to act to cause the dogs 43 and 44 to clutch the flange 21 of the disk 17 thereby to cause the gear-wheels 29, 58 and 53 to coact to rotate the shaft 47 in a direction opposite to the direction of rotation of the shaft 14.

But, if the crank handle 95 be turned to the hole 92, then the dogs 43 and 44 associated with the disk 20 and the lever 67 will be actuated to revolve the shaft 47 at its lowest speed with respect to the speed of the shaft 14.

And, obviously, if it be desired to rotate the shaft 47 at a higher relative speed with respect to the shaft 14, then the crank handle 95 may be turned to the hole 93, while if it be desired to rotate the shaft 47 at its highest speed, with respect to the shaft 14, then the crank handle 95 will be turned to the hole 94.

Thus, an automobile embodying my invention, as illustrated in the accompanying drawings and as hereinbefore described, may be caused to travel in a forward direction at different speeds with relation to a given speed of the shaft 14 and to travel backward at a constant speed with respect to the speed of the shaft 14 and may be brought to a stand-still irrespective of a continued rotation of said shaft 14, all by manipulation of the crank handle 95, said crank handle 95 being readily accessible to the operator of the steering wheel of said automobile.

Obviously, changes may be made in the forms, dimensions and arrangement of parts of my invention without departing from the spirit thereof.

What I claim is:

1. A power transmitting mechanism of the class described, embodying a driving shaft rotatably mounted in suitable bearings; a driven shaft disposed parallel with and spaced from said driving shaft and rotatably mounted in other suitable bearings; a plurality of flanged disks mounted on said driving shaft in spaced positions and adapted freely to rotate therearound; a plurality of clutch dogs associated with the flange of each of said disks and with said shaft and adapted to be actuated to clutch and unclutch said flange; a gearwheel fastened to each of said flanged disks, each of said gearwheels differing in diameter from others thereof; a separate grooved collar mounted on said driving shaft adjacent to each of said flanged disks and adapted to be slidably movable in sidewise directions thereon each of said grooved collars being provided with pins that project from its side toward the adjacent clutch dogs; separate clutch dogs actuating mechanism operatively associated with the clutch dogs of each flanged disk and with the pins of the adjacent grooved collar whereby said clutch dogs will be actuated to clutch and unclutch the flange of said flanged disk in response to sidewise movements of said flanged collar; a separate supporting bracket fixed opposite and spaced from the path of each of said slidably movable grooved collars; a separate lever pivotally mounted on each of said brackets one end portion of said lever being operatively associated with the groove of the adjacent grooved collar whereby said collar may be moved in sidewise directions in response to swinging movements of said lever; a shifting rod adapted to be moved in endwise directions and provided with a plurality of unequally spaced cam-like shoulders, and so operatively disposed with relation to said levers that said cam-like shoulders may swingingly move one or more than one of said levers, as may be desired, each at different times, in response to endwise movements of said shifting rod from its normal position to other different positions whereby the clutch dogs of desired ones of said flanged disks may be actuated; a gearwheel rigidly mounted on said driven shaft; an idler gearwheel rotatably disposed operatively to engage with said gearwheel on said driven shaft and with the gearwheel of one of said flanged disks; and a plurality of other gearwheels rigidly mounted on said driven shaft each of which is disposed operatively to engage with the gearwheel of a different one of the others of said disks.

2. Transmission mechanism including a casing, a driving shaft and a driven shaft journaled therein, means forming communication between the two shafts, the said means including a plurality of devices adapted to cause a variance in speed rotation between the two shafts, means for resiliently connecting two of said devices, and means associated with said devices adapted to be operated to cause only a single one of said devices to be operated at one time.

3. Transmission mechanism including a casing, a driving shaft and a driven shaft journaled therein, means forming communication between the two shafts, the said means including a plurality of devices adapted to cause a variance in speed rotation between the two shafts, means for resiliently connecting two of said devices and means associated with said devices adapted to be operated to cause only a single one of said devices to be operated at one time, the last named means adapted to be moved in a single direction to operate all of said devices.

4. Transmission mechanism including a casing, a driving shaft and a driven shaft journaled therein, means forming communication between the two shafts, the said means including a plurality of devices adapted to cause a variance in speed rotation between the two shafts, means for resiliently connecting two of said devices and means associated with said devices adapted to be operated to cause only a single one of said devices to be operated at one time, the last named means adapted to be moved in a single direction to operate all of said devices, and operatable at a point adjacent the steering wheel of the device.

5. Transmission mechanism including a casing, a driving shaft and a driven shaft journaled therein, means forming communication between the two shafts, the said means including a plurality of devices adapted to cause a variance in speed rotation between the two shafts, means for resiliently connecting two of said devices and means associated with said devices adapted to be operated to cause only a single one of said devices to be operated at one time, the last named means adapted to be moved in a single direction to operate all of said devices, and operatable at a point adjacent the steering wheel of the device, and including a notched segment and a pivoted lever moving over said segment and having means coöperating with the notches therein.

6. Transmission mechanism including a casing, a driving shaft and a driven shaft journaled therein, means forming communication between the two shafts, the said means including a plurality of devices adapted to cause a variance in speed rotation between the two shafts, means for resiliently connecting two of said devices and means associated with said devices adapted to be operated to cause only a single one of said devices to be operated at one time, the last named means including a longitudinally shiftable rod.

7. Transmission mechanism including a casing, a driving shaft and a driven shaft journaled therein, means forming communication between the two shafts, the said means including a plurality of devices adapted to cause a variance in speed rotation between the two shafts, means for resiliently connecting two of said devices and means associated with said devices adapted to be operated to cause only a single one of said devices to be operated at one time, the last named means including a longitudinally shiftable rod adapted to be moved in a single direction to cause operation of all of said devices.

8. Transmission mechanism including a casing, a driving shaft and a driven shaft journaled therein, means forming communication between the two shafts, the said means including a plurality of devices adapted to cause a variance in speed rotation between the two shafts, means for resiliently connecting two of said devices, and means associated with said devices adapted to be operated to cause only a single one of said devices to be operated at one time, the last named means including a longitudinally shiftable rod, and a rack bar associated with said shiftable rod, and a lever controlled pinion meshing with said rack bar for shifting the same.

9. Transmission mechanism including a casing, a driving shaft and a driven shaft journaled therein, means forming communication between the two shafts, the said means including a plurality of devices adapted to cause a variance in speed rotation between the two shafts, and means associated with said devices adapted to be operated to cause only a single one of said devices to be operated at one time, the last named means including a longitudinally shiftable rod, the said devices comprising pivoted levers, and a separate enlargement for each lever carried by said rod adapted to engage the lever associated therewith to cause a selective one of said devices to become operative.

10. Transmission mechanism including a casing, a driving shaft and a driven shaft journaled therein, means forming communication between the two shafts, the said means including a plurality of devices adapted to cause a variance in speed rotation between the two shafts, and means associated with said devices adapted to be operated to cause only a single one of said devices to be operated at one time, the last named means including a longitudinally shiftable rod, the said devices comprising pivoted levers, and enlargements carried by said rod adapted to engage said levers to cause a selective one of said devices to become operative, each enlargement being of a relative different length.

11. Transmission mechanism including a casing, a driving shaft and a driven shaft journaled therein, means forming communication between the two shafts, the said means including a plurality of devices adapted to cause a variance in speed rotation between the shafts, and means associated with said devices adapted to be operated to cause only a single one of said devices to be operated at one time, the last named means including a longitudinally shiftable rod, the said devices comprising pivoted levers, and enlargements carried by said rod adapted to enlarge said levers to cause a selective one of said devices to become operative, each enlargement being of a relative different length, and tension means connecting the inner ends of said levers.

12. Transmission mechanism including a casing, a driving shaft and a driven shaft journaled therein, means forming communication between the two shafts, the said means including a plurality of devices adapted to cause a variance in speed rotation between the two shafts, and means associated with said devices adapted to be operated to cause only a single one of said devices to be operated at one time, the last named means including a longitudinally shiftable rod adapted to be moved in one direction to cause different speeds of rotation of the driven shaft, and when moved in the opposite direction adapted to cause a reverse movement of said driven shaft.

13. Transmission mechanism including a casing, driving and driven shafts journaled therein, meshing gears journaled on said driving shaft and fixed to said driven shaft, flanged disks journaled on said driving shaft and having hubs forming supports for said adjacently positioned gears, a sleeve associated with said disk and fixed to the driving shaft inwardly of the disk flange, arms extending outwardly of said sleeves, levers pivoted on said sleeves and operatively disposed relative to said arms, dogs engaging said sleeves at their inner ends and arranged between said arms and levers, and slotted from one side to receive in said slots the adjacent disk flange, means for normally holding said dogs in wedging contact with said disk flanges, and means adapted to engage said levers to shift the same upon their pivots to disengage the dogs from said disk flanges.

14. Transmission mechanism including a casing, driving and driven shafts journaled therein, meshing gears journaled on said driving shaft and fixed to said driven shaft, flanged disks journaled on said driving shaft and having hubs forming supports for said adjacently positioned gears, a sleeve associated with said disk and fixed to the driving shaft inwardly of the disk flange, arms extending outwardly of said sleeves, levers pivoted on said sleeves and operatively disposed relative to said arms, dogs engaging said sleeves at their inner ends and arranged between said arms and levers, and slotted from one side to receive in said slots the adjacent disk flange, means for normally holding said dogs in wedging contact with said disk flanges, and means adapted to engage said levers to shift the same upon their pivots to disengage the dogs from said disk flanges, the said means including a plurality of independently operating collars slidably mounted on said driving shaft and having means adapted to engage said levers to shift the same for rendering the dogs inoperative.

15. Transmission mechanism including a casing, driving and driven shafts journaled therein, meshing gears journaled on said driving shaft and fixed to said driven shaft, flanged disks journaled on said driving shaft and having hubs forming supports for said adjacently positioned gears, a sleeve associated with said disk and fixed to the driving shaft inwardly of the disk flange, arms extending outwardly of said sleeves, levers pivoted on said sleeves and operatively disposed relative to said arms, dogs engaging said sleeves at their inner ends and arranged between said arms and levers, and slotted from one side to receive in said slots the adjacent disk flange, means for normally holding said dogs in wedging contact with said disk flanges, and means adapted to engage said levers to shift the same upon their pivots to disengage the dogs from said disk flanges, and a plurality of sleeves slidably mounted on said driving shaft, means carried by said sleeves adapted to engage said levers to operate the same, levers pivoted within said case in engagement with said slidable sleeves, tension means connecting the said levers and an operating cam rod in engagement with the inner ends of said levers.

In witness whereof, I hereunto subscribe my name this ninth day of December, A. D. 1916.

JOHN D. JOHNSON.

Witnesses:
FRANK WARREN,
GEO. BLAIR.

Copies of this patent may be obtained for five cents each, by addressing the "Commissioner of Patents, Washington, D. C."